United States Patent
Hwang

(10) Patent No.: US 7,317,700 B2
(45) Date of Patent: Jan. 8, 2008

(54) METHOD AND APPARATUS FOR CELL-SPECIFIC HSDPA PARAMETER CONFIGURATION AND RECONFIGURATION

(75) Inventor: Woonhee Hwang, Helsinki (FI)

(73) Assignee: Nokia Corporation, Espoo (FI)

( * ) Notice: Subject to any disclaimer, the term of this patent is extended or adjusted under 35 U.S.C. 154(b) by 999 days.

(21) Appl. No.: 10/337,234

(22) Filed: Jan. 6, 2003

(65) Prior Publication Data

US 2003/0153323 A1    Aug. 14, 2003

Related U.S. Application Data

(60) Provisional application No. 60/346,661, filed on Jan. 8, 2002.

(51) Int. Cl.
*H04Q 7/00* (2006.01)
(52) U.S. Cl. .............. 370/328; 370/327; 370/329; 370/330; 370/335; 370/338; 370/340; 370/341; 370/342
(58) Field of Classification Search ............ None
See application file for complete search history.

(56) References Cited

U.S. PATENT DOCUMENTS

| | | | | |
|---|---|---|---|---|
| 6,163,524 | A * | 12/2000 | Magnusson et al. | 370/208 |
| 6,697,347 | B2 * | 2/2004 | Ostman et al. | 370/335 |
| 7,113,496 | B2 * | 9/2006 | Koo et al. | 370/335 |
| 2001/0005378 | A1 * | 6/2001 | Lee | 370/459 |
| 2001/0043576 | A1 * | 11/2001 | Terry | 370/328 |
| 2002/0136193 | A1 | 9/2002 | Chang et al. | |
| 2002/0160782 | A1 * | 10/2002 | Joshi et al. | 455/452 |
| 2002/0168945 | A1 | 11/2002 | Hwang et al. | |
| 2003/0002472 | A1 | 1/2003 | Choi et al. | |

OTHER PUBLICATIONS

*Third Generation Partnership Project; Technical Specification Group Radio Access Network; UTRAN Iub Interface NBAP Signalling (Release 5)*; 3GPP TS 25.433 V5.1.0 (Jun. 2002); Sections 8.2.18 and 9.1.62; Jun. 2002.
*Evolving WCDMA*; Tomas Hedberg and Stefan Parkvall; Ericsson Review No. 2, 2000; pp. 124-131.

* cited by examiner

*Primary Examiner*—Duc M. Nguyen
*Assistant Examiner*—Matthew Genack
(74) *Attorney, Agent, or Firm*—Ware, Fressola, Van Der Sluys & Adolphson LLP

(57) ABSTRACT

A method by which resources of a cell under the supervision of a controlling radio network controller (CRNC) are reserved for providing high speed downlink packet access via a high speed downlink shared channel (HS-DSCH) having one or more corresponding physical channels (HS-PDSCHs), the method including as steps: a step (61) in which the CRNC for the Node B serving the cell sends to the Node B a message conveying cell-specific high speed downlink packet access HSDPA information indicating codes for the HS-DSCH and for an associated high speed shared control channel (HS-SCCH) and also indicating a maximum allowed value for the combined power of the HS-SCCH and the HS-PDSCHs; and a step (63) in which the Node B communicates to the CRNC a cell-specific HSDPA resource response indicating either the resources the Node B has reserved or indicating only whether or not all the resources requested by CRNC were successfully reserved.

23 Claims, 6 Drawing Sheets

METHOD AND APPARATUS FOR CELL-SPECIFIC HSDPA PARAMETER CONFIGURATION AND RECONFIGURATION

CROSS REFERENCE To RELATED APPLICATION

Reference is made to and priority claimed from U.S. provisional application Ser. No. 60/346,661, filed Jan. 8, 2002, entitled NEW PROCEDURES FOR CELL-SPECIFIC HSDPA PARAMETER CONFIGURATION AND RECONFIGURATION.

TECHNICAL FIELD

The present invention pertains to the field of cellular communications. More particularly, the present invention pertains to providing high speed downlink packet access (HSDPA) according to release 5 of the so-called Third Generation Partnership Program (3GPP) for the Universal Mobile Telecommunication System (UMTS).

BACKGROUND ART

For release 5 (Rel5) of the 3GPP (Third Generation Partnership Program), as an enhancement to the pre-Rel5 shared channel concept, it has been agreed to add the so-called High Speed Downlink Packet Access (HSDPA) concept to the TiNTS (Universal Mobile Telecommunications System) Terrestrial Radio Access Network (UTRAN) architecture (illustrated in FIG. 1). The basic idea behind the HSDPA is to offer a shared high speed downlink (transport) channel (called HS-DSCH, for high-speed downlink shared channel) for use in communicating packet data to a UE (user equipment) device 18 (FIG. 1). As with the current DSCH, every UE device to which data can be transmitted on the HS-DSCH has an associated dedicated physical channel (DPCH). The DPCH is used to carry power control commands for the associated uplink, and if needed, other services, such as circuit-switched voice. The HS-DSCH offers a higher data rate and a fast retransmission mechanism, namely the HARQ (Hybrid Automatic Repeat Request) mechanism, provided by Node B 17 (FIG. 1). In pre-release 5 implementations, the only official shared channel in 3GPP in downlink is DSCH for which retransmission is always provided by the RLC (Radio Link Control) in the RNC (Radio Network Controller) 11 (FIG. 1) of UTRAN, which is relatively slow retransmission mechanism.

To support HSDPA (and especially HARQ), Rel5 of 3GPP defines a new MAC (Medium Access Control) entity, called MAChs (for MAC-high speed), located in Node B, as opposed to being located in the RNC, and more specifically in the RRC (Radio Resource Control) of the RNC, which is where all MAC entities capable of handling user plane data reside in UTRAN prior to Rel5. The MAC-hs exists at a Node B only when the Node B (i.e. the Node B cell) is configured to support HSDPA and is connected via the Iub interface to either MAC-c/sh (MAC-control/shared) or to MAC-d (MAC-dedicated), both of which are located in the RNC. The basic interfaces in UTRAN are indicated in FIG. 1. FIG. 2 illustrates MAC-hs in UTRAN per 3GPP Rel5, showing it connected to the MAC-c/sh through the Iub interface (and illustrating that the transport channel being used by MAC-hs is HS-DSCH, which corresponds in rel99 to the ordinary downlink shared channel DSCH transport channel). FIG. 3 illustrates the radio interface protocol architecture of HSDPA per Rel5, showing that the HS-DSCH FP (frame protocol) provides HS-DSCH FP data frames through the Iub interface. FIG. 4 illustrates the MAC architecture and MAC-c/sh detail on the UTRAN side, and FIG. 5 illustrates the MAC architecture and MAC-hs detail on the UTRAN side.

Due to the fact that as set out in Rel5, MAC-hs always resides only in Node B, and because Rel5 has Node B offering HARQ, Rel5 can be said to reorganize the functional split between Node B and RNC. In line with the reorganization, the scheduling/priority handling and the TFC (transport format combination) selection function (the task of selecting an appropriate transport format for control and user data) is assigned to Node B in Rel5, and so moved from RNC (either the serving RNC or the controlling RNC, if different from the serving RNC). As a result, final scheduling and data traffic control for HSDPA in Rel5 is not under RNC, but instead under Node B, as illustrated in FIGS. 4 and 5. (FIG. 4 shows that in MAC-c/sh (located in RNC), Scheduling/Priority Handling is provided for channels other than MAC-hs, such as PCH, FACH, and DSCH. FIG. 4 shows also that in MAC-c/sh, HSDPA data bypasses Scheduling/Priority Handling and is instead processed by the task indicated as Flow Control MAC-d MAC-hs, which provides it to MAC-hs. FIG. 5 shows Scheduling/Priority Handling for HSDPA located in MAC-hs, which is in Node B. Thus, the scheduling/Priority Handing for HSDPA is located in Node B in Rel5.)

Due to the functional reorganization and the new functionality (HARQ) in Node B, the pre-Rel5 3GPP application protocol procedures on Iub for DSCH setup and reconfiguration, in which the RNC allocated codes (of a code tree, allowing different users to use the same channel because different codes from the code tree make respective different communications orthogonal) to individual users (at radio link setup), cannot be used for HS-DSCH. The HS-DSCH provided by Rel5 corresponds to a shared channelization code resource, shared among the users primarily in the time domain; the code resource (and other resources) are provided to the Node B of a cell as a pool of cell-specific resources by the controlling RNC (CRNC) as (semi-static), and the Node B then allocates resources from the pool of cell-specific resources to individual UE devices in the cell (i.e. as user-specific resources). The cell-specific code resource consists of multiple codes of spreading factor 16. A part of the code tree is allocated for the HS-DSCH, while the remaining part is simultaneously used for other channels, e.g., dedicated channels used for speech services. Allocation by the Node B among the users of the shared code resource (and other resources), i.e. allocation by the Node B among the users of resources in the pool of cell-specific resources, is done on the basis of the 2 ms HS-DSCH TTI (Transmission Time Interval), and so is described here as being done dynamically as opposed to the semi-static allocation of the cell-specific resource pool by the CRNC for the Node B to use. The use of a short TTI allows for tracking fast fading, improves the granularity in the scheduling process, and reduced roundtrip delays. As mentioned, simultaneous transmission to multiple users is possible by using distinct parts of the codes allocated for HS-DSCH transmission, although the primary way of sharing the code resource is in the time domain.

Currently in 3GPP, two procedures can be considered for providing cell-specific parameters: cell setup/reconfiguration; and common transport channel setup/reconfiguration. Neither procedure is satisfactory, however, since both are intended for handling only truly static parameters. (These procedures are generally used only to configure a cell initially, not to later then change the parameters at all often, but only typically every few days or so, or even only as infrequently as monthly.)

The cell-specific HSDPA parameters are advantageously changed even as often as every 100 ms, and so existing NBAP (Node B Application Part) procedures are not adequate. Moreover, in case it is necessary to trigger a cell-specific HSDPA parameter reconfiguration according to an RNC algorithm (such as the RNC load-sharing algorithm, which can initiate the parameter reconfiguration), the existing procedures in NBAP are not suitable because the existing procedures (Cell Setup/Configuration and Common Transport Channel Setup/reconfiguration) are tied to the O&M (operation and maintenance) function and for these procedures to provide (changes to) cell-specific parameters would requires that they be adapted (changed). Moreover, as mentioned above, the existing procedures convey only static parameters, whereas HSDPA cell-specific parameters should be adjusted fairly often (though not at all as often as each TTI).

What is needed is a new Iub procedure for configuring and reconfiguring cell-specific parameters for a cell.

DISCLOSURE OF THE INVENTION

Accordingly, in a first aspect of the invention, a method is provided by which, for a cell in which user equipment devices access a radio network via a Node B under the supervision of a controlling radio network controller (CRNC), resources are reserved for providing high speed downlink packet access (HSDPA) via a high speed downlink shared channel (HS-DSCH) and one or more corresponding physical channels (HS-PDSCHs) into which the HS-DSCH is mapped, the method including: a step (61) in which the CRNC for the Node B serving the cell sends to the Node B a message conveying cell-specific HSDPA information indicating resources requested by the CRNC including codes for the HS-DSCH and for an associated high speed shared control channel (HS-SCCH) and also indicating a maximum allowed value for the combined power of the HS-SCCH and each the corresponding physical channels (HS-PDSCHs) into which the HS-DSCH is mapped; and a step (63) in which the Node B communicates to the CRNC a cell-specific HSDPA resource response indicating information about resources successfully reserved by the Node B in response to the message conveying cell-specific HSDPA information.

In accord with the first aspect of the invention, the information about resources successfully reserved by the Node B may indicate only whether or not all requested resources were successfully reserved.

Also in accord with the first aspect of the invention, the information about resources successfully reserved by the Node B may indicate the resources that were successfully reserved.

Still also-in accord with the first aspect of the invention, the method may also include a step in which the Node B, in response to the cell-specific HSDPA information, reserves resources as a pool of resources from which to draw resources needed to provide HSDPA for individual user equipment devices in the cell.

Even still also in accord with the first aspect of the invention, the method may also include a step in which the CRNC communicates to a serving radio network controller (SRNC) an HSDPA parameter change indication message indicating information about resources successfully reserved by the Node B in response to the message conveying cell-specific HSDPA information. Further, the information about resources successfully reserved by the Node B may indicate only whether or not all requested resources were successfully reserved. Also further, the information about resources successfully reserved by the Node B may indicate the resources that were successfully reserved.

In a second aspect of the invention, an apparatus is provided comprising means for carrying out the steps performed by the CRNC according to the first aspect of the invention.

In a third aspect of the invention, an apparatus is provided comprising means for carrying out the steps performed by the Node B according to the first aspect of the invention.

In a fourth aspect of the invention, a system is provided comprising a Node B and a CRNC, each operative according to respective steps of the method provided by the first aspect of the invention.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

Figure 1:
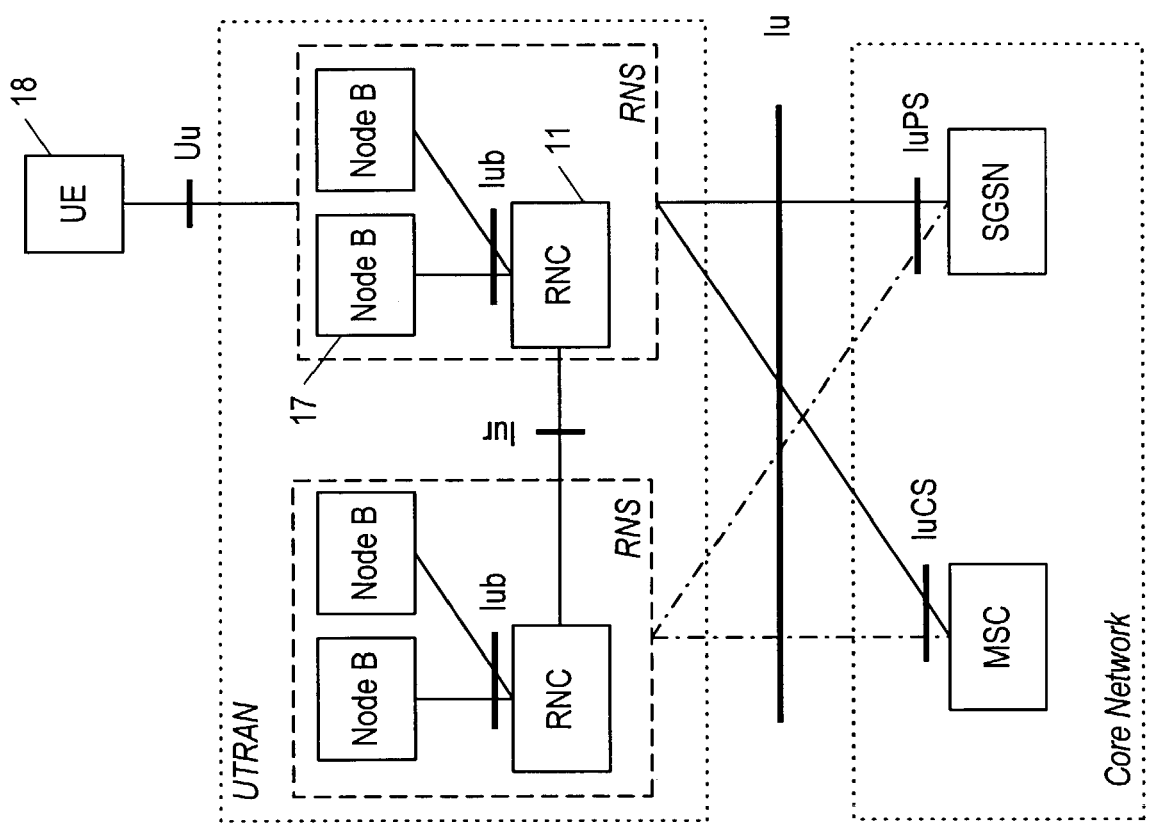
FIG. 1 is a block diagram/flow diagram of UTRAN showing basic interfaces.
Figure 2:
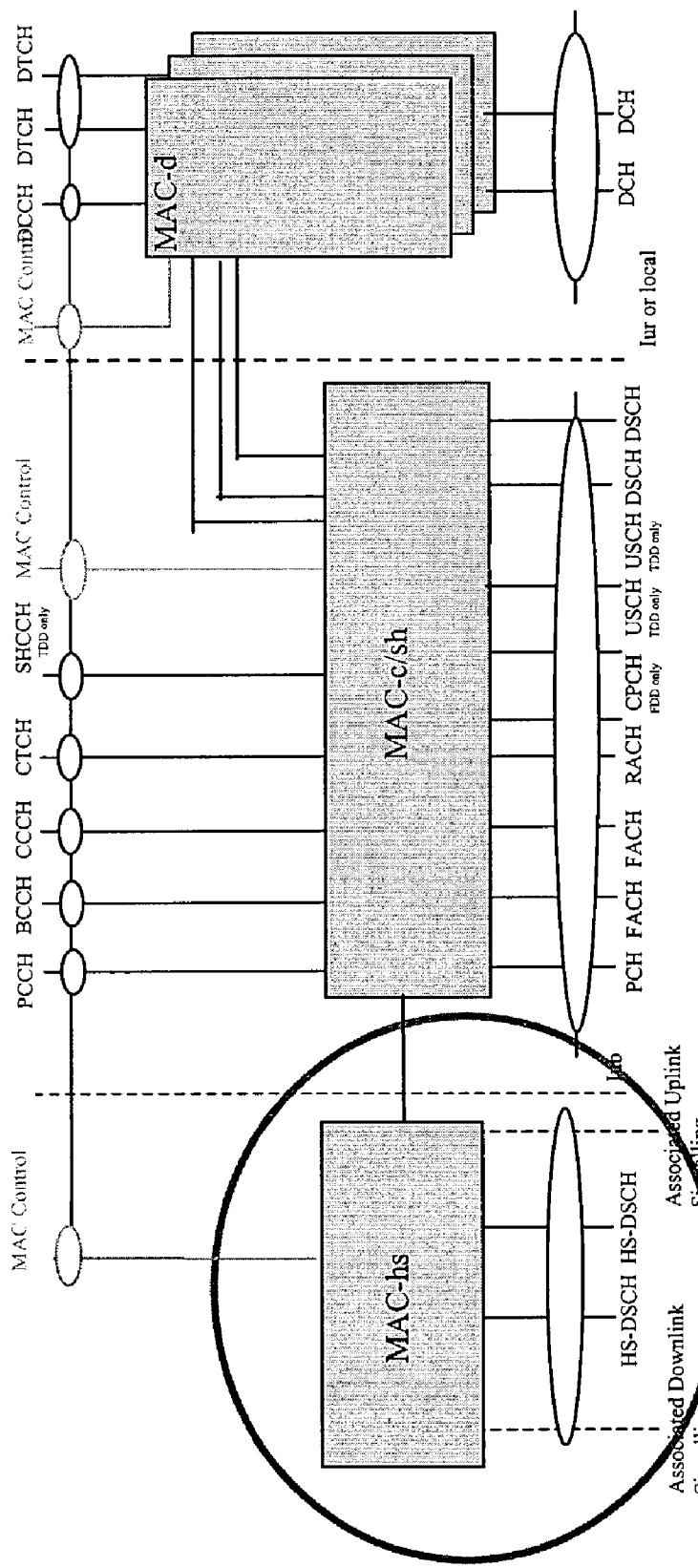
FIG. 2 is a schematic/block diagram of the overall MAC architecture on the UTRAN side of UMTS (as opposed to the core network side)
Figure 3:
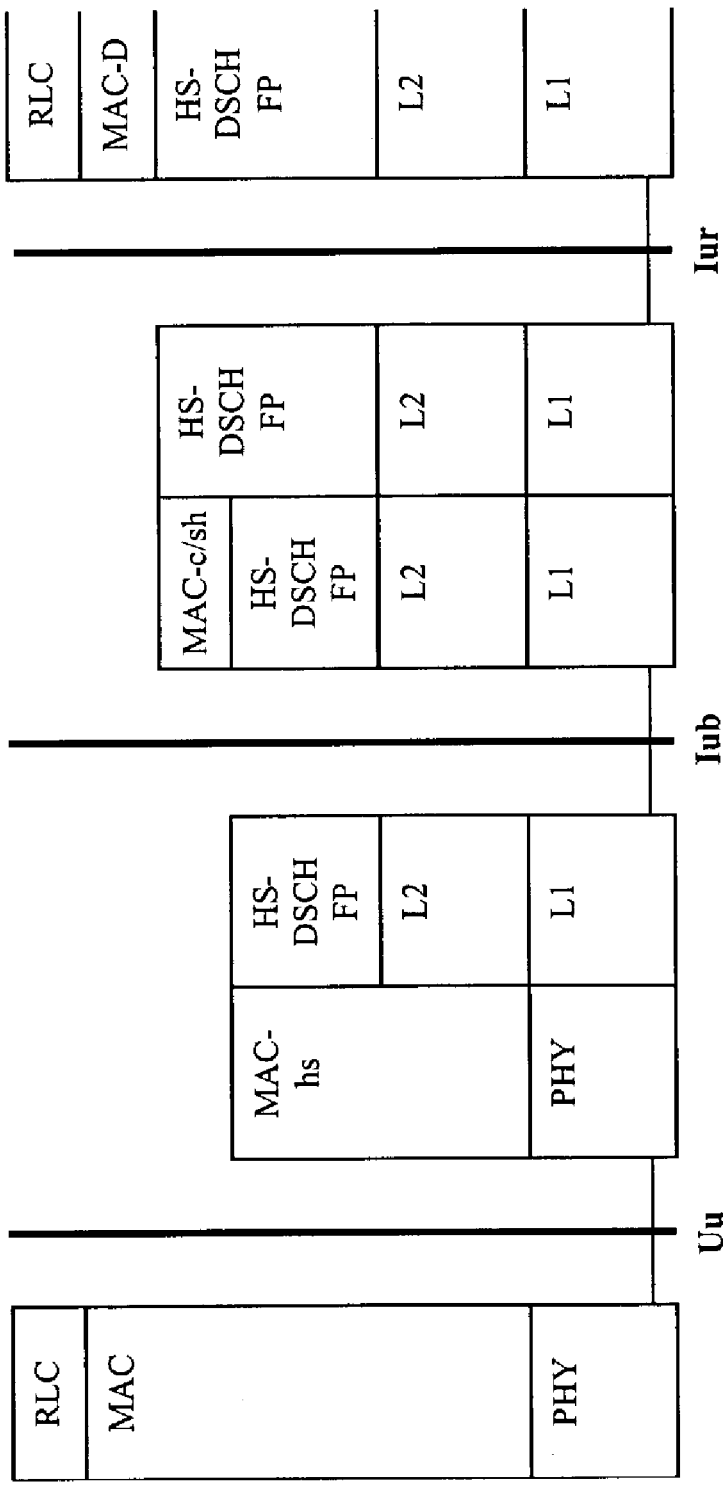
FIG. 3 is a schematic/block diagram illustrating the radio interface protocol architecture of HSDPA.
Figure 4:
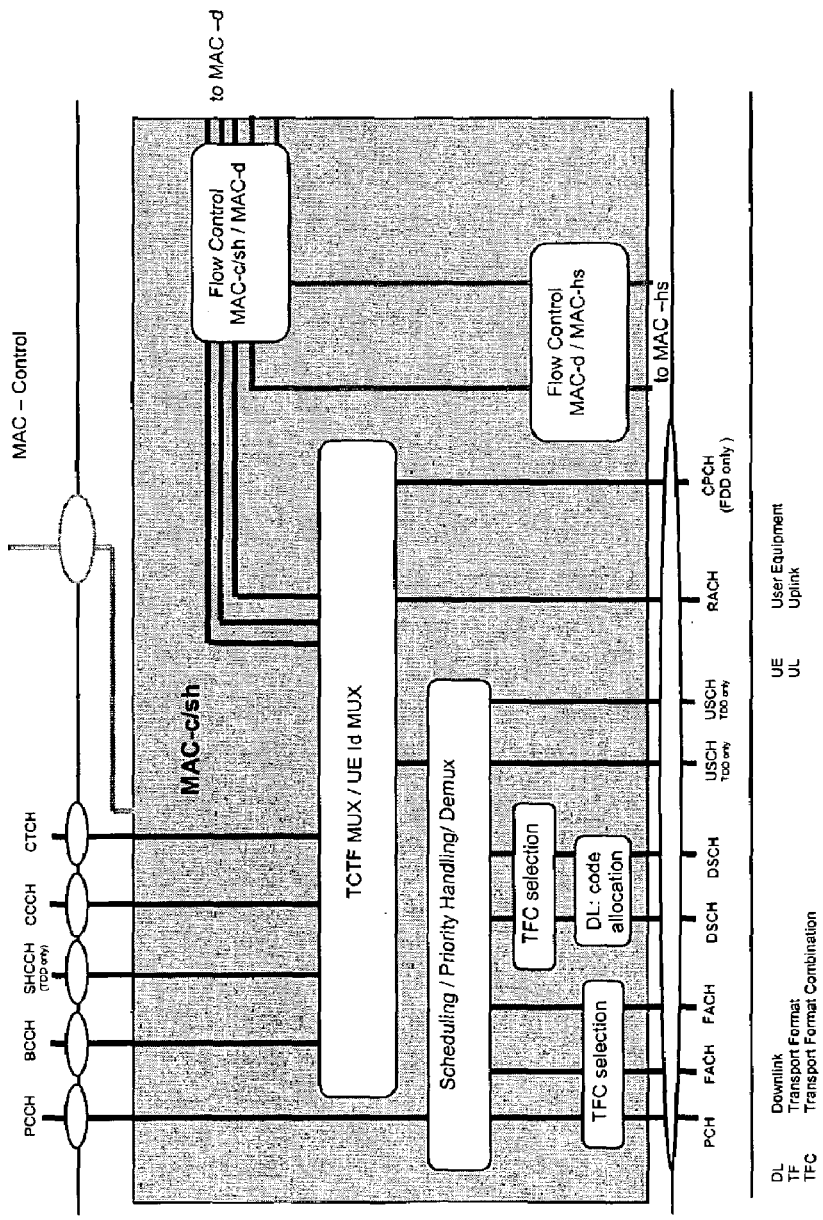
FIG. 4 is a schematic/block diagram illustrating the MAC architecture and MAC-c/sh detail on the UTRAN side.
Figure 5:
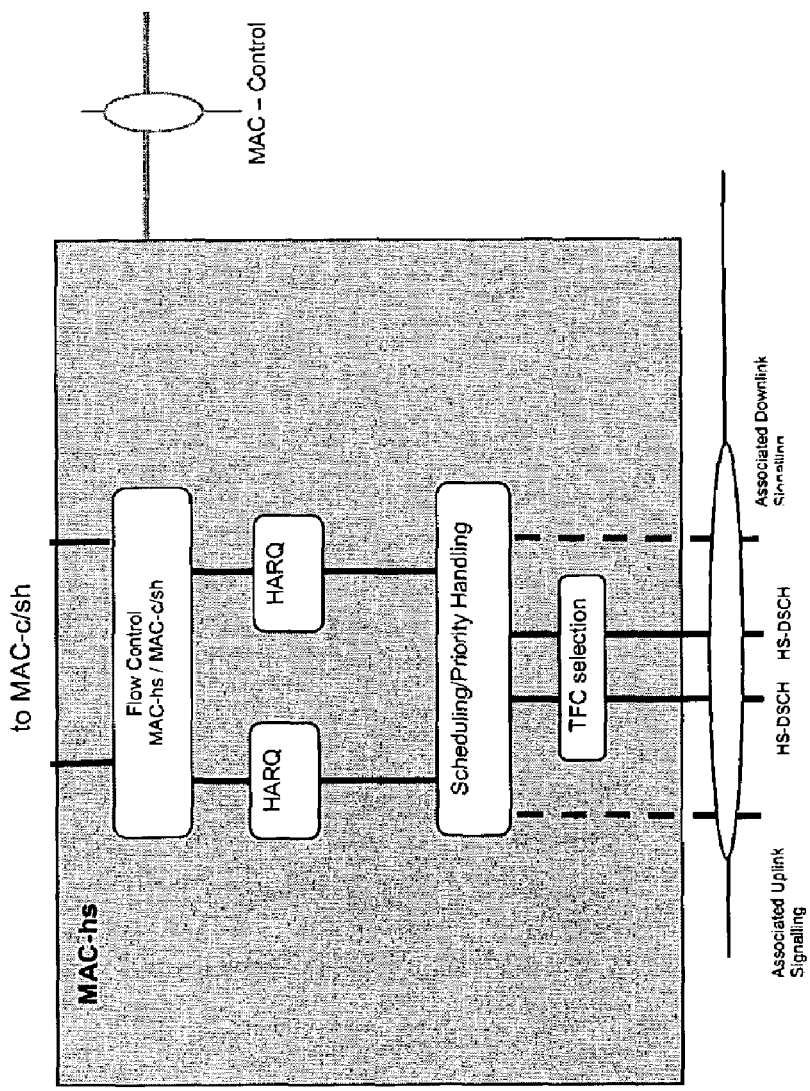
FIG. 5 is a schematic/block diagram illustrating the MAC architecture and MAC-hs detail on the UTRAN side.

The invention provides a procedure for HSDPA code allocation analogous to that for DSCH code allocation over Iur (the RNC-RNC interface, as shown in FIG. 1) in that, according to the invention, CRNC assigns channelization codes (and other resources) to a cell served by a Node B as a pool of resources from which to assign codes (and other resources) to HSDPA users in the cell, and the CRNC then advises the serving RNC (SRNC) of the assignment (resource reservation). As usual, HSDPA is provided via the high speed downlink shared channel (HS-DSCH) and the high speed synchronization control channel (HS-SCCHs); HS-SCCH conveys necessary control information while HS-DSCH conveys associated data packets. To decode HS-DSCH, a user equipment (UE) device must first analyze HS-SCCH.

Figure 6:
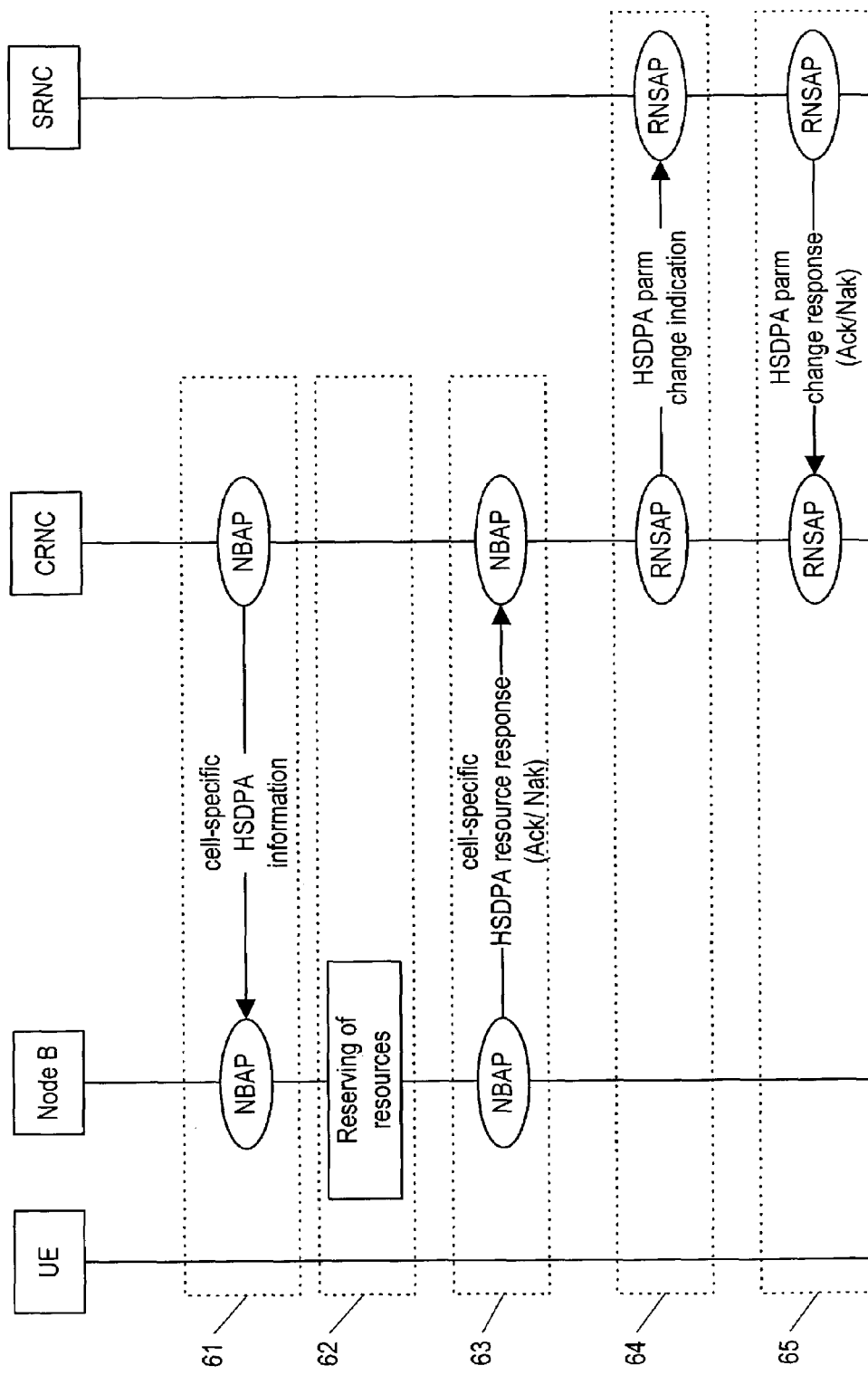
FIG. 6 is a schematic/block diagram illustrating the cell (Node B) specific parameter signalling flow, according to the invention.

Referring now to FIG. 6, in a first step 61, the CRNC for the Node B which has HSDPA capable cell sends to the Node B a message conveying cell-specific HSDPA information, i.e. information indicating resources being requested for use in providing HSDPA in the cell, including codes (allocation of codes from a code tree) for HS-DSCH, codes for the HS-SCCH, and a maximum allowed value for the combined power of the HS-SCCH and the one or more physical channels HS-PDSCHs (high speed physical downlink shared channels) corresponding to the HS-DSCH (a transport channel); (the HS-DSCH can be mapped/segmented into one or more HS-PDSCHs). The message is sent from a Node B Application Part (NBAP) of the CRNC to a peer NBAP in the Node B. In a next step 62, the Node B reserves resources needed to provide HSDPA, per the cell-specific HSDPA information. In a next step 63, the Node B communicates to the CRNC a cell-specific HSDPA resource response, indicating that the resources have been reserved. The response can be e.g. an acknowledgement (Ack) or a negative acknowledgement (Nak) signal. In some scenarios, the Node B will not be able to reserve all of the requested resources, and in some embodiments, in such scenarios, the Node B indicates only that it is not able to reserve (all of) the requested resources. In other such embodiments, the Node B indicates what resources it was able to successfully reserve.

In a next step 64, assuming that the Node B has reserved the HSDPA resources, the CRNC communicates to the serving RNC (SRNC) an HSDPA parameter (parm) change indication message, i.e. a message indicating that HSDPA resources have been reserved, and indicating specifically the resources that have been reserved. The message is sent from a Radio Network Subsystem Application Part (RNSAP) in the CRNC to a peer entity in the SRNC. In those scenarios in which the Node B is not able to reserve all of the requested resources, in the embodiments in which the Node B indicates what resources it was able to successfully reserve (as opposed to simply indicating it was not able to reserve all requested resources), the CRNC indicates corresponding information to the SRNC, i.e. information indicating what resources the Node B was able to successfully reserve.

Finally, assuming that all the resources were successfully reserved, in a next step 65, the SRNC responds back to the CRNC (by e.g. Ack/Nak signaling) indicating whether or not the resource reservation made by the Node B (which could be for less than what the CRNC requested) is acceptable.

Scope of the Invention

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method by which, for a cell in which user equipment devices access a radio network via a Node B under the supervision of a controlling radio network controller, resources are reserved for providing high speed downlink packet access via a high speed downlink shared channel and one or more corresponding physical channels into which the high speed downlink shared channel is mapped, the method comprising:

the controlling radio network controller for the Node B serving the cell sending to the Node B a message conveying cell-specific high speed downlink packet access information indicating resources requested by the controlling radio network controller including codes for the high speed downlink shared channel and for an associated high speed shared control channel and also indicating a maximum allowed value for the combined power of the high speed shared control channel and each of the corresponding physical channels into which the high speed downlink shared channel is mapped; and the Node B communicating to the controlling radio network controller a cell-specific high speed downlink packet access resource response conveying information indicating whether any of the requested resources have been successfully reserved by the Node B in response to the message conveying cell-specific high speed downlink packet access information.

2. A method as in claim 1, wherein the information about resources successfully reserved by the Node B indicates only whether or not all requested resources were successfully reserved.

3. A method as in claim 1, wherein the information about resources successfully reserved by the Node B indicates the resources that were successfully reserved.

4. A method as in claim 1, further comprising the Node B, in response to the cell-specific high speed downlink packet access information, reserving resources as a pool of resources from which to draw resources needed to provide high speed downlink packet access for individual user equipment devices in the cell.

5. A method as in claim 1, further comprising the controlling radio network controller communicating to a serving radio network controller a high speed downlink packet access parameter change indication message indicating information about resources successfully reserved by the Node B in response to the message conveying cell-specific high speed downlink packet access information.

6. A method as in claim 5, wherein the information about resources successfully reserved by the Node B indicates only whether or not all requested resources were successfully reserved.

7. A method as in claim 5, wherein the information about resources successfully reserved by the Node B indicates the resources that were successfully reserved.

8. An apparatus comprising means for carrying out the steps of claim 1 performed by the controlling radio network controller.

9. An apparatus comprising means for carrying out the step of claim 1 performed by the Node B.

10. A system comprising a Node B and a controlling radio network controller, each operative according to respective steps of the method of claim 1.

11. A radio access network implementing high speed downlink packet access via a high speed downlink shared channel and an associated high speed shared control channel, comprising:

a controlling radio network controller, for controlling a Node B serving a cell of the radio access network, and for sending to the Node B a message conveying cell-specific high speed downlink packet access information indicating resources requested by the controlling radio network controller including codes for the high speed downlink shared channel and for the associated high speed shared control channel, and also indicating a maximum allowed value for the combined power of the high speed shared control channel and each corresponding physical channel into which the high speed downlink shared channel is mapped; and the Node B communicating to the controlling radio network controller a cell-specific high speed downlink packet access resource response conveying information indicating whether any of the requested resources have been resources successfully reserved by the Node B in response to the message conveying cell-specific high speed downlink packet access information.

12. A radio access network as in claim 11, wherein the controlling radio network controller is further for communicating to a serving radio network controller a high speed downlink packet access parameter change indication message indicating information about resources successfully reserved by the Node B in response to the message conveying cell-specific high speed downlink packet access information.

13. A radio access network as in claim 11, wherein the information about resources successfully reserved by the Node B indicates only whether or not all requested resources were successfully reserved.

14. A radio access network as in claim 11, wherein the information about resources successfully reserved by the Node B indicates the resources that were successfully reserved.

15. A Node B of a radio access network implementing high speed downlink packet access via a high speed downlink shared channel and an associated high speed shared control channel, comprising a Node B application part, configured to:
   receive from a controlling radio network controller of the radio access network a message conveying cell-specific high speed downlink packet access information indicating resources requested by the controlling radio network controller including codes for the high speed downlink shared channel and for the associated high speed shared control channel, and also indicating a maximum allowed value for the combined power of the high speed shared control channel and each corresponding physical channel into which the high speed downlink shared channel is mapped; and
   communicate to the controlling radio network controller a cell-specific high speed downlink packet access resource response conveying information indicating whether any of the requested resources have been resources successfully reserved by the Node B in response to the message conveying cell-specific high speed downlink packet access information.

16. A Node B as in claim 15, wherein the information about resources successfully reserved by the Node B indicates only whether or not all requested resources were successfully reserved.

17. A Node B as in claim 15, wherein the information about resources successfully reserved by the Node B indicates the resources that were successfully reserved.

18. A radio network controller of a radio access network implementing high speed downlink packet access via a high speed downlink shared channel and an associated high speed shared control channel, comprising a Node B application part configured to:
   send to a Node B controlled by the radio network controller a message conveying cell-specific high speed downlink packet access information indicating resources requested by the radio network controller including codes for the high speed downlink shared channel and for the associated high speed shared control channel, and also indicating a maximum allowed value for the combined power of the high speed shared control channel and each corresponding physical channel into which the high speed downlink shared channel is mapped; and
   receive from the Node B a cell-specific high speed downlink packet access resource response conveying information indicating whether any of the requested resources have been successfully reserved by the Node B in response to the message conveying cell-specific high speed downlink packet access information.

19. A radio network controller as in claim 18, further comprising a radio network subsystem application part configured to communicate to a serving radio network controller a high speed downlink packet access parameter change indication message indicating whether any of the requested resources have been successfully reserved by the Node B in response to the message conveying cell-specific high speed downlink packet access information.

20. A radio network controller as in claim 18, wherein the information about resources successfully reserved by the Node B indicates only whether or not all requested resources were successfully reserved.

21. A radio network controller as in claim 18, wherein the information about resources successfully reserved by the Node B indicates the resources that were successfully reserved.

22. A method for use by a radio network controller in controlling a Node B serving a cell of a cellular communication system, comprising:
   sending to the Node B a message conveying cell-specific high speed downlink packet access information indicating resources requested by the radio network controller including codes for the high speed downlink shared channel and for an associated high speed shared control channel and also indicating a maximum allowed value for the combined power of the high speed shared control channel and each of the corresponding physical channels into which the high speed downlink shared channel is mapped; and
   receiving from the Node B a cell-specific high speed downlink packet access resource response indicating whether any of the requested resources have been successfully reserved by the Node B in response to the message conveying cell-specific high speed downlink packet access information.

23. A method for use by a Node B serving a cell of a cellular communication system under the control of a radio network controller of the cellular communication system, comprising:
   receiving a message from the radio network controller conveying cell-specific high speed downlink packet access information indicating resources requested by the radio network controller including codes for the high speed downlink shared channel and for an associated high speed shared control channel and also indicating a maximum allowed value for the combined power of the high speed shared control channel and each of the corresponding physical channels into which the high speed downlink shared channel is mapped; and
   sending to the radio network controller a cell-specific high speed downlink packet access resource response indicating whether any of the requested resources have been successfully reserved by the Node B in response to the message conveying cell-specific high speed downlink packet access information.

* * * * *